July 14, 1970   W. C. HADLEY   3,520,173
AUTOMATED TEST APPARATUS
Original Filed July 17, 1963
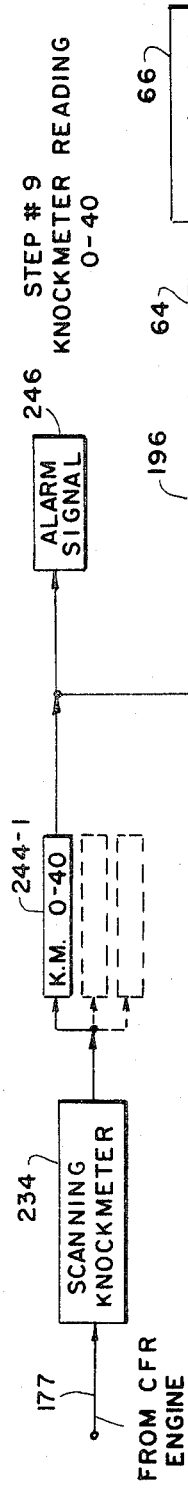
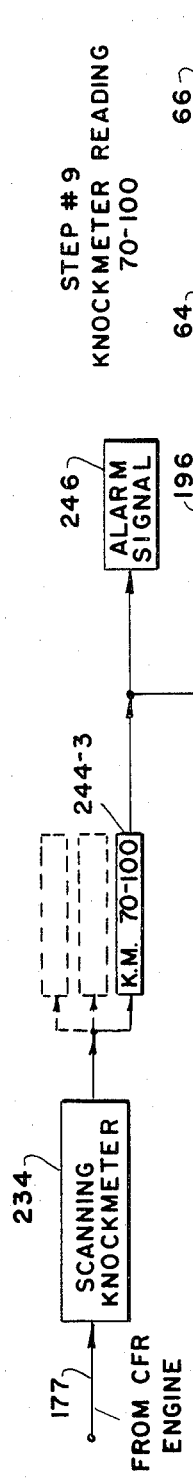
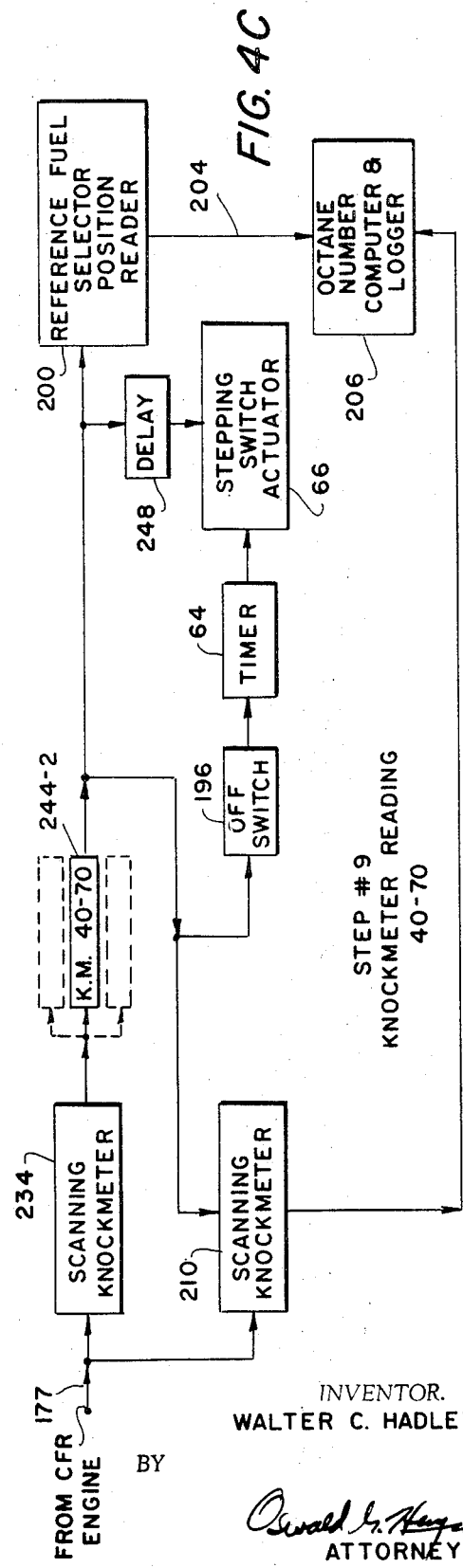
INVENTOR.
WALTER C. HADLEY
BY
ATTORNEY

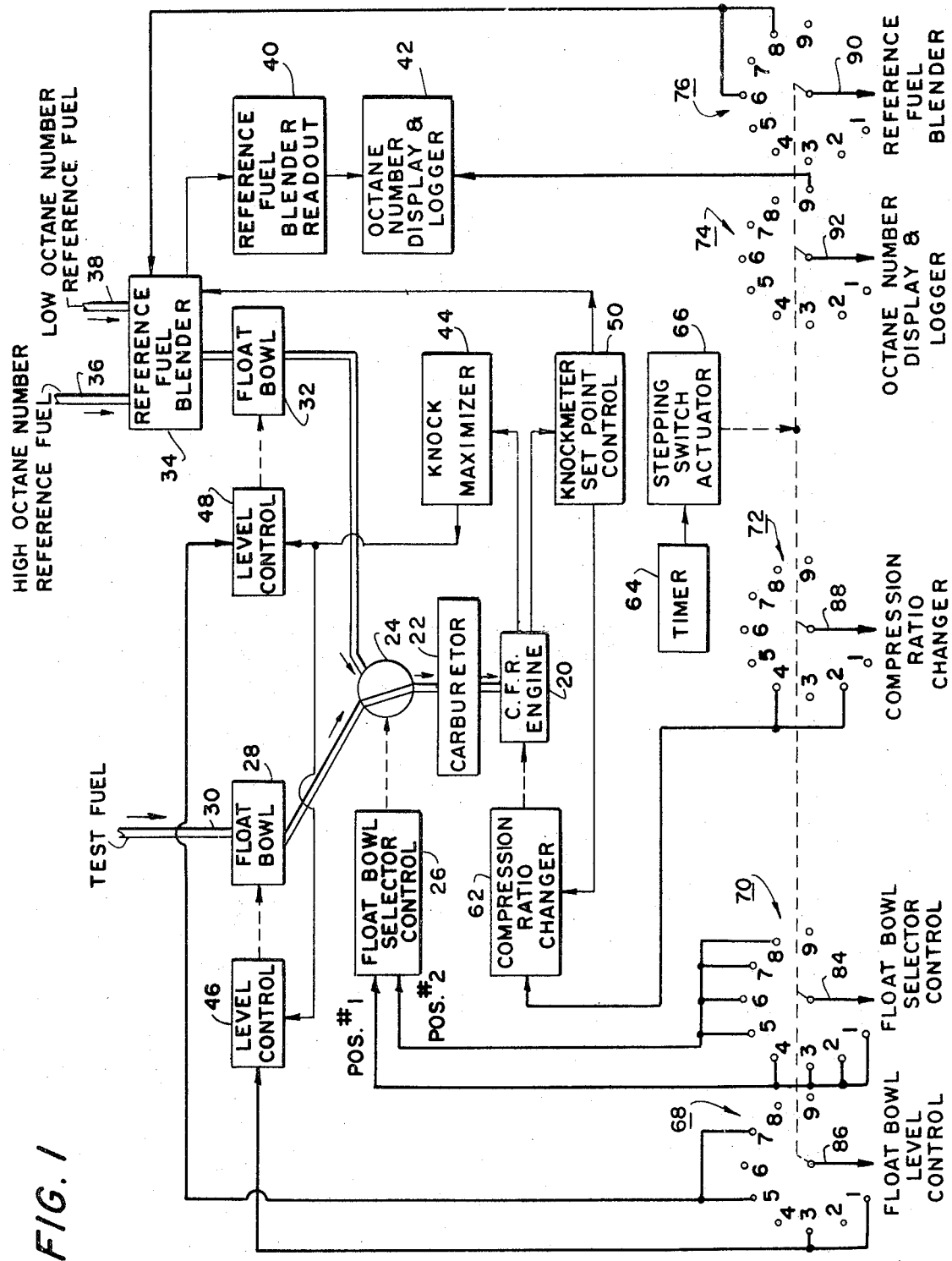

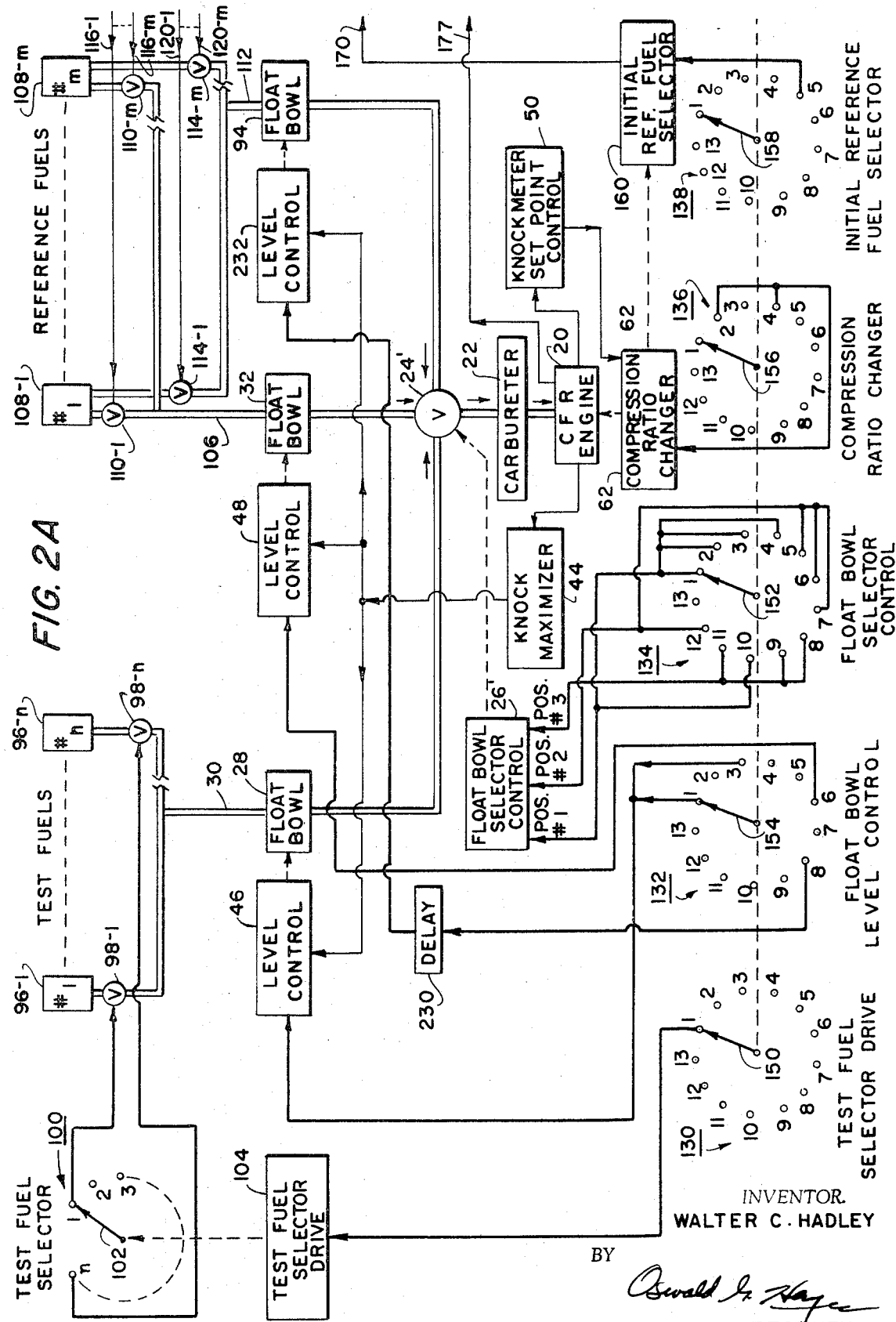

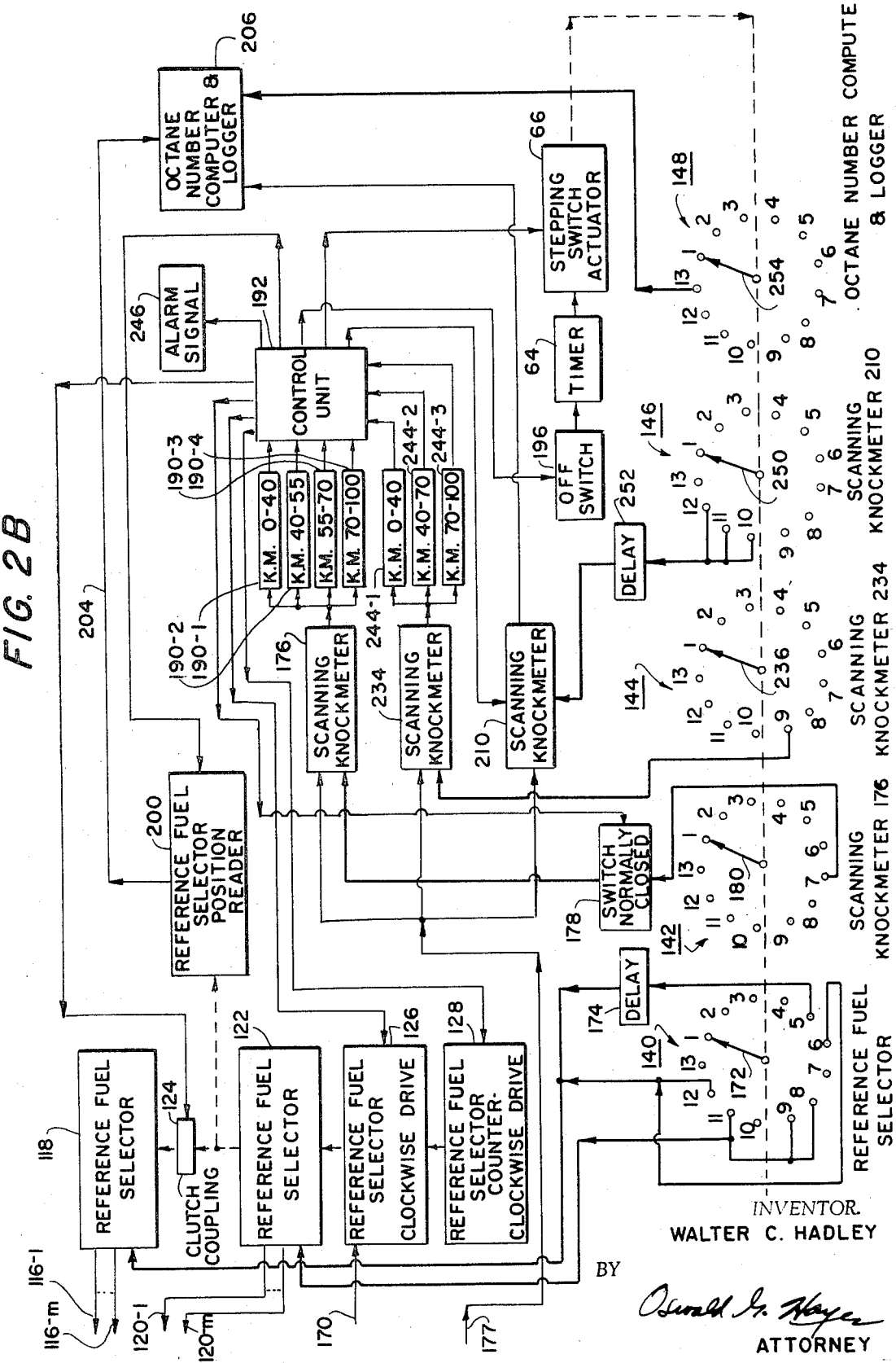

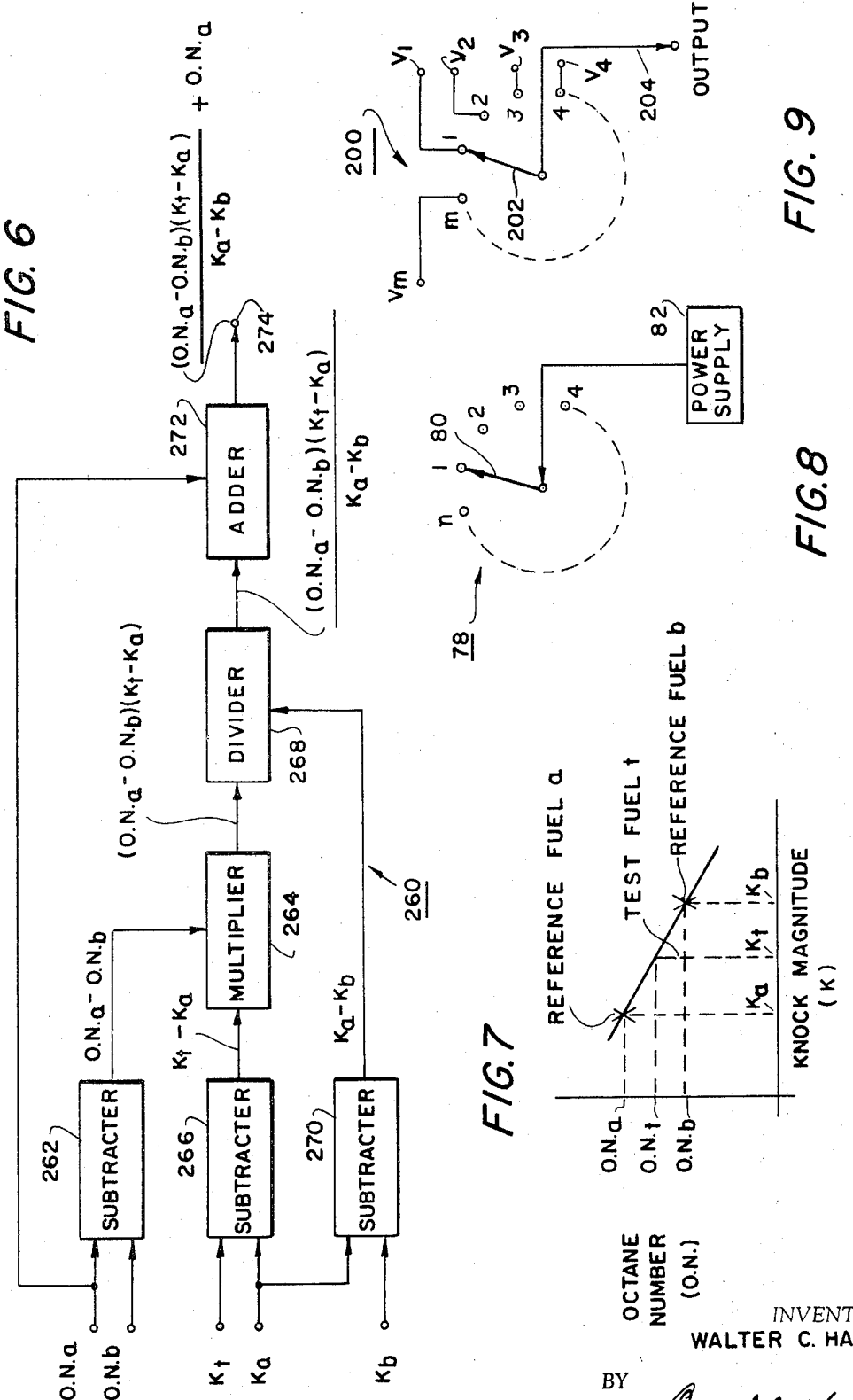

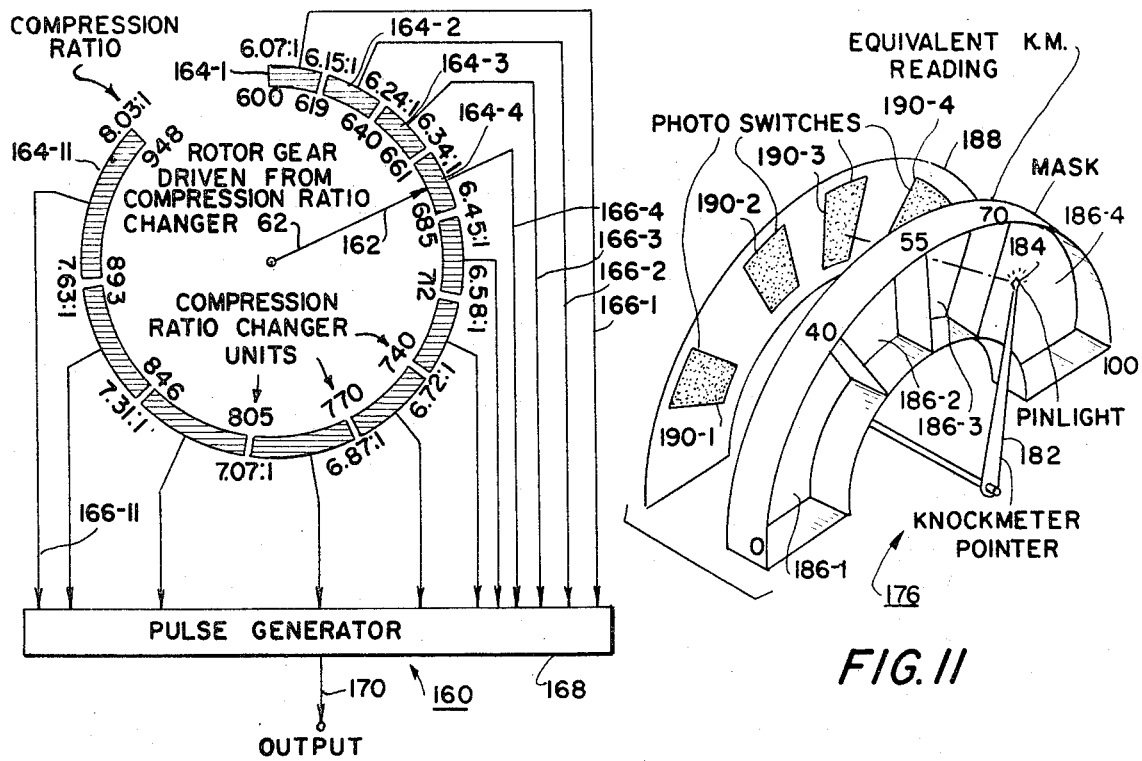
FIG. 10
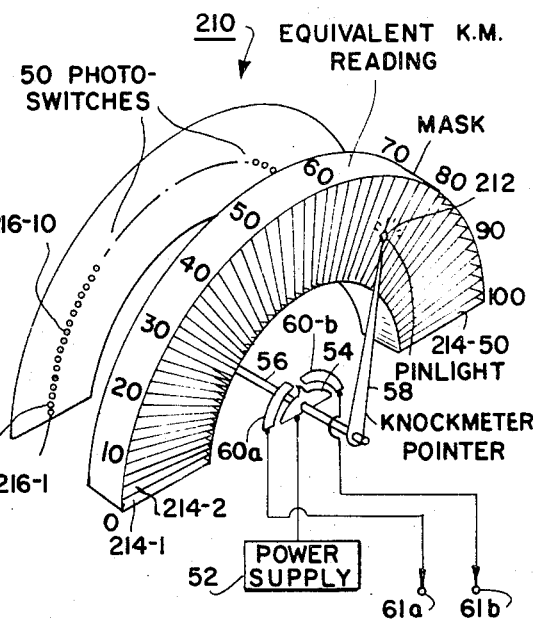
FIG. 11
FIG. 12
FIG. 13
INVENTOR.
WALTER C. HADLEY
BY Oswald G. Hayes
ATTORNEY

United States Patent Office 3,520,173
Patented July 14, 1970

3,520,173
AUTOMATED TEST APPARATUS
Walter C. Hadley, West Redding, Conn., assignor to Mobil Oil Corporation, a corporation of New York
Continuation of application Ser. No. 295,745, July 17, 1963. This application May 2, 1967, Ser. No. 635,624
Int. Cl. G01l 23/22; G01n 33/22
U.S. Cl. 73—35                                    4 Claims

ABSTRACT OF THE DISCLOSURE

Automated system for determining the octane number of a test gasoline which comprises powering a standard test engine with the gasoline. The compression ratio of the engine is adjusted to obtain a standard, knock intensity and the fuel-air ratio of the gasoline is adjusted to maximize knock intensity. A reference blend compriisng two gasolines of known octane is then fed to the engine and the proportions of the two gasolines and the fuel-air ratio of the blend are automatically varied until the knock intensity conforms to the standard. The octane number of the test gasoline is also determined by powering the engine with reference gasolines of known octane at fuel-air ratios that maximize knock intensity until two reference gasolines are selected whose knock intensities bracket that of the test gasoline.

---

This application is a continuation of S.N. 295,745, filed July 17, 1963, now abandoned.

This invention relates to the determination of the combustion qualities of fuels and, more particularly, to the automatic regulation of test apparatus used in determining such combustion qualities.

In the testing of fuels to determine their combustion qualities, in particular, in the testing of motor fuels such as gasolines, the tests conducted are typically performed manually. For example, the American Society for Testing Materials (ASTM) has prescribed a number of tests, an illustrative one of which is designated D908–61, to determine the propensity of a gasoline to detonate or knock, i.e., to experience rapid combustion of its unburned end gases in the firing chamber of an engine cylinder. The propensity of the gasoline to detonate or knock is expresed in terms of an octane number whose magnitude is inversely related to the detonation propensity, and is determined by actual test in a standard engine operated under standard conditions.

Briefly, with the engine powered by the test gasoline in a combustible fuel-air mixture, the engine is adjusted to produce a standard detonation intensity at a fuel-air ratio that maximizes detonation intensity. This is accomplished in a series of discrete steps by manually varying the fuel level in the carburetor float bowl to change the fuel-air ratio until maximum intensity detonation is achieved, and by manually varying the adjustable cylinder head of the engine until the standard detonation intensity is obtained. Reference gasoline blends of known octane numbers are then introduced to the engine under the same general conditions and the same compression ratio, with the fuel-air ratios of the blending being adjusted for maximum intensity detonation, and their detonation intensities are noted. The octane number of the test gasoline is then determined by interpolation between the intensity readings of two reference gasolines whose detonation intensities bracket that of the test sample.

In accordance with the present invention, the testing of one or more fuels is carried out automatically without requiring any manual operation of the testing apparatus. In an illustrative embodiment of the invention, a gasoline, for example, is tested in a standard test engine of the type described above which is automatically adjusted to produce a standard detonation intensity of the test gasoline at the fuel-air ratio that maximizes detonation intensity. A soon as these conditions have been met, engine adjustment is terminated and the engine is powered by a reference fuel that is blended, for example, from two reference fuels of known octane numbers. The proportions of the two reference fuels in the blend are varied automatically, as well as the fuel-air ratio of the blend, until detonation of the blend in the test engine conforms to the standard established for the test. The proportions of the reference fuels constituting the blend are then noted, and the octane number of the test fuel is thus established by relating reference fuel proportions to octane number.

In an alternative embodiment of the invention, one or more fuels such as gasolines are tested automatically in a test engine that is programmed to carry out the steps of a typical one of the standard ASTM tests referred to above. Specifically, the engine is supplied with a test fuel and is automatically adjusted to produce standard detonation intensity at the fuel-air ratio that maximizes detonation intensity. With the engine fixed at this adjustment, reference gasolines of known octane numbers are then chosen and supplied to the engine at fuel-air ratios that maximize detonation intensity, and their detonation intensities are noted, until two reference gasolines are selected whose detonation intensities bracket that of the test gasoline. The octane number of the test gasoline is then determined automatically by a computing circuit from the detonation intensities of the test sample and the two bracketing reference fuels, as well as the known octane numbers of the two reference fuels.

The invention is described in detail in the following description, which is to be read in conjunction with the appended drawings, in which:

FIG. 1 is a block diagram of an illustrative fuel testing system in accordance with the invention, in which a fuel blend is produced having the same combustion characteristics as the fuel under test;

FIGS. 2A and 2B, taken together, are a block diagram of an alternative embodiment of the invention, wherein the combustion quality of a test fuel is determined in a standard engine automatically regulated to carry out the steps of an existing approved test;

FIGS. 3A, 3B, 3C, and 3D are block diagrams of circuits forming a portion of the system of FIGS. 2A and 2B;

FIGS. 4A, 4B, and 4C are block diagrams of circuits forming a portion of the system of FIGS. 2A and 2B;

FIG. 6 is a block diagram of a portion of the computer of FIG. 5;

FIG. 7 is a curve showing the relationship between a test fuel and two bracketing reference fuels in terms of octane number and knock or detonation magnitude;

FIGS. 8 and 9 are diagrams of switches useful in the systems of FIGS. 1 and 2A and 2B;

FIG. 10 is a diagram of a pulse generating circuit useful in the system of FIGS. 2A and 2B; and FIGS. 11, 12, and 13 are pictorial representations of knockmeters useful in the systems of FIGS. 1 and 2A and 2B.

THE SYSTEM OF FIG. 1

Figure 3A:
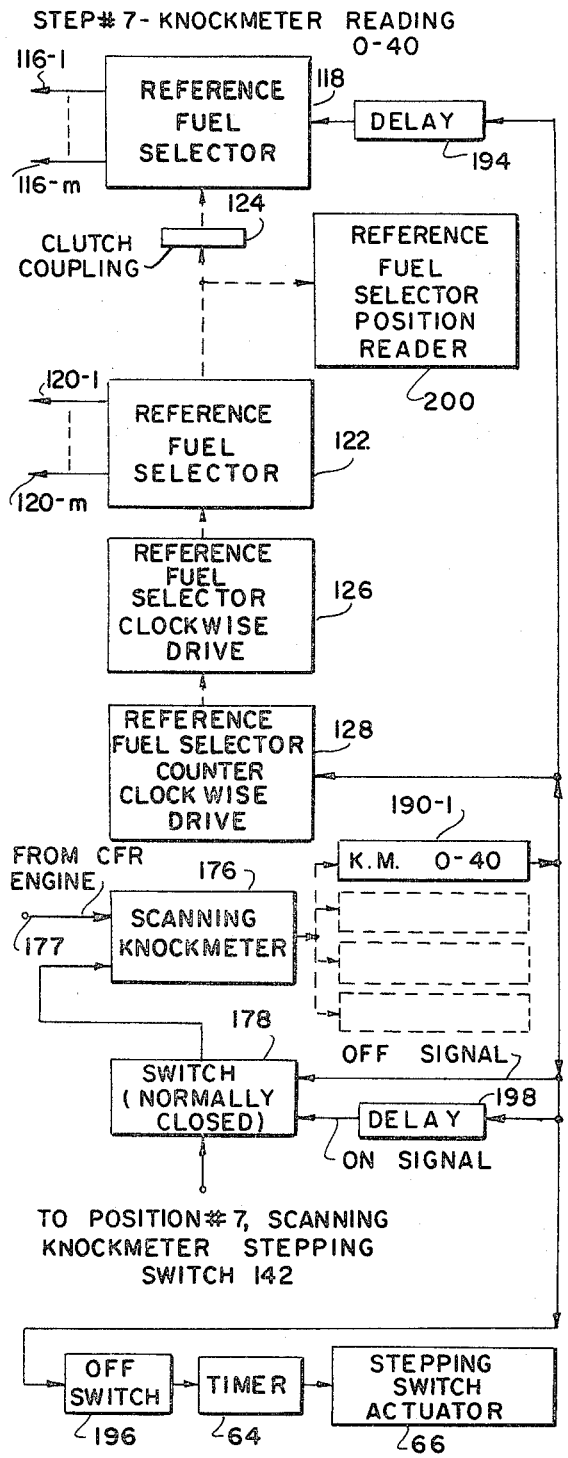

FIG. 1 shows a system for determining the octane number of a test gasoline by blending from two reference gasolines of known octane number a gasoline blend having the same detonation or knocking characteristics as that of the test fuel. A test engine 20, such as the standard ASTM–CFR engine described in ASTM Manual for Rating Motor Fuels by Motor and Research Methods (1960), is supplied with a combustible fuel-air mixture from a carburetor 22. The carburetor 22 in turn receives fuel from a selector valve 24 which is under the control of a float bowl selector control 26. The selector valve 24 couples the carburetor 22 either to a float bowl 28, which receives a test fuel from an input line 30, or to a float bowl 32, which receives fuel from a reference fuel blender 34.

The blender 34, which may comprise a proportioning pump, for example, is supplied with a reference fuel of relatively high octane number through a line 36 and a reference fuel of relatively low octane number through a line 38. The blender is coupled to a reference fuel blender readout 40 which provides an indication of the setting of the blender and hence the proportions of the low octane number and high octane number reference fuels constituting the reference gasoline blend. The blender readout 40 is in turn coupled to an octane number display and logger 42, which may comprise a suitably calibrated indicator, for example, that translates the reading of the blender readout into an octane number. Suitable recording equipment may be included to log or record the octane number.

The engine 20, as powered by either the test fuel or the reference fuel blend, is coupled to a knock maximizer 44, which detects detonation or knocking in the engine 20 and generates signals that are applied to level controls 46 and 48 which determine the fuel levels in the float bowls 28 and 32, respectively. Specifically, the knock maximizer 44 varies one of the level controls 46 and 48, depending upon which of the controls is energized, so that for the particular fuel supplied to the engine 20 knocking is maximized. The knock maximizer 44 may take the form of an electrical-to-pneumatic transducer and of a Moore Optimizer, Model 571, as described in Bulletin 5701 of Condensed Catalogue of Moore Products, 8th ed., Philadelphia, Pa. (1962). The source of the knock signal applied to the knock maximizer 44 may be one of the standard Phillips detonation meters Models 501 and 501A which generate an electrical output signal representative of knock intensity. Each of the level controls 46 and 48 may comprise, for example, a motor coupled to the level control adjustment knob of the standard ASTM adjustable fuel level carburetor shown in FIG. 29 (page 132) of the 1960 ASTM Manual referred to above.

The engine 20 is also coupled to a knockmeter set point control 50, which may form part of a typical knockmeter that is used, as provided by any one of the standard ASTM tests, to indicate the magnitude of detonation in the engine 20. Such a set point control is shown in FIG. 13 and includes a power supply 52 coupled to an electrically conductive contact 54 that is attached to shaft 56 of knockmeter pointer 58. The position of the pointer 58 is dependent upon the magnitude of knocking in the engine 20 and in certain positions of the pointer the contact 54 is electrically connected to one of two conductive segments 60a and 60b, which are coupled to outlet terminals 61a and 61b, respectively. The conductive segments 60a and 60b are separated, the point of separation corresponding to a predetermined position of the pointer 58, such as a knockmeter reading of 55. If the knockmeter reading is less than 55, the outlet terminal 61a is energized; if the knockmeter reading is greater than 55, the outlet terminal 61b is energized; if the knockmeter reading is 55, neither outlet terminal is energized.

Signals generated by the knockmeter set point control 50 are applied to the reference fuel blender 34 as well as to a compression ratio changer 62. The compression ratio changer may comprise a motor coupled to the typical manual arrangement for changing the compression ratio in the engine shown in FIG. 16 on pages 104 and 105 of the 1960 ASTM manual referred to above. When energized, the compression ratio changer 62, in response to signals from the knockmeter set point control 50, adjusts the compression ratio in the engine 20 so that knocking or detonation in the engine conforms to a predetermined standard, such as a knockmeter magnitude of 55. When the blender 34 is energized, the blend of gasoline formed from the high octane number and low octane number reference fuel is varied in response to signals from the knockmeter set point control 50 to produce a blend which results in detonation conforming to the predetermined standard.

The various components of the system shown in FIG. 1 are under the control of a timer 64 which periodically energizes a stepping switch actuator 66. The actuator is coupled to a float bowl level control stepping switch 68, to a float bowl selector control stepping switch 70, to a compression ratio changer stepping switch 72, to an octane number display and logger stepping switch 74, and to a reference fuel blender stepping switch 76. There stepping switches, which serve to energize selectively the various components to which they are connected, may each take the form of the switch 78 shown in FIG. 8. As shown in that figure, a movable contact 80 is adapted to be moved to any one of contacts 1, 2, 3, 4 . . . $n$. The movable contact 80 is coupled to a power supply 82, and thus serves to apply power to that one of the contacts 1, 2, 3, 4 . . . $n$ to which it is connected.

The following description is given to show how the system of FIG. 1 operates in a series of nine discrete steps to carry out a typical test of a test fuel.

Step 1

It is assumed that all of the stepping switches 68 through 76 are in the positions shown in the figure. The timer 64 energizes the stepping switch actuator 66 and causes all of the stepping switches to be moved to their first positions. Thus, movable contact 84 of the stepping switch 70 is coupled to terminal 1 of the switch, thereby applying power to a position 1 input of the float bowl selector control 26. When this input of the control 26 is energized, the control actuates the selector valve 24 to couple the float bowl 28 to the carburetor 22, thereby supplying the carburetor with the test fuel. At the same time, movable contact 86 of the stepping switch 68 is connected to terminal 1 of the switch, thereby applying power to and energizing the level control 46. When energized, the level control 46 is controlled by signals from the knock maximizer 44 to vary the fuel level in the float bowl 28 until maximum intensity detonation occurs in the test engine 20. The knock maximizer 44 retains the fuel level in the float bowl 28 constant at this level.

Step 2

After sufficient time has elapsed to ensure that the maximum intensity detonation level of fuel in the float bowl 28 has been achieved, the timer 64 energizes the stepping switch actuator 66 and causes all the stepping switches 68 through 76 to move to their second positions. The stepping switch 70 still applies power to the position 1 input of the float bowl selector control 26, thereby continuing to apply the test fuel to the carburetor 22. The movable contact 86 of the stepping switch 68 no longer energizes the level control 46, thereby leaving the fuel level in the float bowl 28 fixed at the maximum intensity detonation level established in Step 1. Movable contact 88 of the stepping switch 72 energizes terminal 2 of the switch, thereby applying power to and energizing the compression ratio changer 62. The compression ratio changer, as explained above, is controlled by signals from the knockmeter set point control 50, and thus the compression ratio in the engine 20 is adjusted so that detonation in the engine conforms to the standard established for the test, such as a knockmeter reading of 55.

Step 3

After sufficient time has elapsed to ensure that the compression ratio in the engine 20 is established and is maintained at that point producing standard knocking, the timer 64 energizes the stepping switch actuator 66 and causes the stepping switches 68 through 76 to move to their third positions. The stepping switch 70 continues to energize the position 1 input of the float bowl selector control 26 to apply the test fuel to the carburetor 22. The stepping switch 72 de-energizes the compression ratio changer 62, thus leaving the compression ratio in the engine 20 fixed at that setting producing standard detonation. The stepping switch 68 energizes its terminal 3, which re-energizes the level control 46. As explained above, the level control, as regulated by the knock maximizer 44, varies the fuel level in the float bowl 28 so that maximum intensity detonation is achieved and maintained.

Step 4

After a predetermined interval, the timer 64 energizes the stepping switch actuator 66 and causes the stepping switches 68 through 76 to move to their fourth positions. The float bowl selector control stepping switch 70 continues to provide for the supplying of the test fuel to the carburetor 22. The stepping switch 68 de-energizes the level control 46, thereby retaining the fuel level in the float bowl 28 at a maximum intensity detonation level established in Step 3. The stepping switch 72 energizes terminal 4 of the switch to re-energize the compression ratio changer 62 and to permit the compression ratio in the engine 20 to be changed so that detonation is established and maintained at the standard established by the knockmeter set point control 50.

As may be noted, the first four positions of the stepping switches 68 through 76 provide for the sequential adjustment of fuel-air ratio and compression ratio, two adjustments being made for each, to ensure that the engine 20 is operated for the test fuel at standard detonation at the fuel-air ratio which maximizes detonation intensity.

Step 5

After a predetermined interval, the timer 64 causes the stepping switches 68 through 76 to be moved to their fifth positions. The stepping switch 70 energizes terminal 5 of the switch, thereby energizing a position 2 input of the float bowl selector control 26 and de-energizing the position 1 input. With the position 2 input of the control 26 energized, the selector valve 24 is actuated to couple the float bowl 32 to the carburetor 22, thereby supplying the reference blend of fuel from the blender 34 to the carburetor. At the same time, contact 86 of the stepping switch 68 energizes terminal 5 of the switch, thereby applying power to and energizing the level control 48. The level control 48, as regulated by signals from the knock maximizer 44, varies the fuel level in the float bowl 32 to establish and maintain maximum intensity detonation in the engine 20.

Step 6

After a predetermined interval, the timer 63 causes the stepping switches 68 through 76 to be moved to their sixth positions. The stepping switch 70 still energizes the position 2 input of the float bowl selector control 26, thus continuing to supply the reference fuel blend to the carburetor 22. The stepping switch 68, however, de-energizes the level control 48, leaving the fuel level in the float bowl 32 fixed at the maximum intensity detonation level. Movable contact 90 of the stepping switch 76 energizes terminal 6 of the switch, thereby applying power to and energizing the reference fuel blender 34. The blender is controlled by signals from the knockmeter set point control 50, and thus varies the proportions of high octane number and low octane number reference fuels forming the blended fuel until detonation in the engine 20 conforms to the preestablished standard. The blend of gasoline resulting in standard knocking is maintained by the control 50.

Step 7

After sufficient time has elapsed to ensure that the fuel from the blender 34 is of the proper composition to achieve standard detonation, the timer 64 causes the stepping switches 68 through 76 to move to their seventh positions. The float bowl selector control stepping switch 70 continues to supply the blended reference fuel to the carburetor 22. The stepping switch 76 de-energizes the reference fuel blender 34, leaving the blend fixed at its last composition. The stepping switch 68 energizes its terminal 7 to energize the level control 48 and to vary the fuel-air ratio of the reference blend of fuel so that maximum intensity detonation is achieved and maintained.

Step 8

After a predetermined interval, the timer 64 causes the stepping switches 68 through 76 to be moved to their eighth positions. The float bowl selector control stepping switch 70 continues to supply the reference blend of fuel to the carburetor 22. The stepping switch 68 de-energizes the level control 48, thereby retaining the fuel level in the float bowl 32 at that level producing maximum intensity detonation in the engine 20. The stepping switch 76 energizes its terminal 8, which energizes the reference fuel blender 34. Thus, the proportions of high octane number and low octane number reference fuels are again varied until the reference blend of fuel is of a composition which produces the standard detonation, as determined by the knockmeter set point control 50.

As may be noted, in positions 5 through 8 of the stepping switches 68 through 76, the level control 48 and the reference fuel blender 34 are sequentially activated, each twice, to ensure that a reference fuel blend is produced which results in standard detonation intensity at a fuel-air ratio which maximizes detonation intensity. The blend is established under the same engine conditions as were maintained for the fuel under test.

Step 9

The timer 64 then causes the stepping switches 68 through 76 to be moved to their ninth positions. Thus, movable contact 92 of the stepping switch 74 energizes its terminal 9, thereby energizing the octane number display and logger 42. Accordingly, the setting of the reference fuel blender readout 40, which is indicative of the proportions of high octane number and low octane number fuels in the established reference fuel blend, is coupled to the octane number display and logger wherein the setting is translated into an octane number. In this fashion, a reference blend of fuel is produced having the same knocking characteristic as that of the test fuel, and the octane number of the reference blend is then taken to be the octane number of the test fuel.

The timer 64 next causes the stepping switches 68 through 76 to be moved again to their first positions, thereby repeating the test sequence to determine again the octane number of the same or another test fuel.

THE SYSTEM OF FIGS. 2A AND 2B

FIGS. 2A and 2B, when taken together, show a system for determining the octane numbers of a plurality of test fuels, wherein the fuels are applied to a standard ASTM–CFR engine automatically regulated to carry out all the steps of a typical ASTM test, such as D908–61. To elaborate, one of the test fuels is selected and applied to the test engine which is regulated, typically by varying its compression ratio, to establish knocking in accordance with a predetermined standard, such as a knockmeter magnitude of 55, at a fuel-air ratio that maximizes knock intensity. The engine conditions are then fixed, and, based upon the compression ratio established for the engine, one of a plurality of reference fuels of known octane numbers is selected which is most likely to produce standard detonation when introduced to the engine. The selected reference fuel is then applied to the engine, with its fuel-air ratio adjusted to produce maximum intensity detonation. If the detonation observed for the reference fuel does not fall within a predetermined range from the standard established for the test, additional reference fuels are selected and applied to the engine until a reference fuel is selected which falls within this range.

Based upon the ultimately selected reference fuel, the system then selects a second reference fuel whose detonation intensity, when taken with the detonation intensity of the first reference fuel, will bracket the detonation intensity of the test fuel. The second reference fuel is then applied to the engine, with its fuel-air ratio adjusted to produce maximum intensity detonation, and the detonation intensity for the fuel is noted.

Following the selection of the first and second bracketing reference fuels, these fuels, together with the test fuel, are re-applied to the engine and their detonation intensities noted. Signals representing the detonation intensities of the test and bracketing reference fuels, as well as the octane numbers of the reference fuels, are applied to a computer which determines the octane number of the test fuel. Following this, the test is repeated for another test fuel, and this continues until all test fuels have been tested.

In the system of FIGS. 2A and 2B, some of the components are the same as certain components in the system of FIG. 1, and these include the test engine 20, the carburetor 22, the float bowls 28 and 32, and their corresponding level controls 46 and 48, the knock maximizer 44, the knockmeter set point control 50, the compression ratio changer 62, the timer 64, and the stepping switch actuator 66. A selector valve 24', under the control of a float bowl selector control 26', couples one of float bowls 28, 32, and 94 to the carburetor 22.

The float bowl 28 is coupled by line 30 to $n$ test fuels in fuel sources 96–1 . . . 96–$n$ through associated valves 98–1 . . . 98–$n$. The valves 98–1 . . . 98–$n$ are controlled by a test fuel selector 100. Depending upon the position of a movable contact 102, which is driven by a test fuel selector drive 104, one of the valves 98–1 . . . 98–$n$ is energized, coupling the associated test fuel source to the float bowl 28.

The float bowl 32 is coupled by a line 106 to $m$ reference fuels in fuel sources 108–1 . . . 108–$m$ through associated valves 110–1 . . . 110–$m$. The float bowl 94 is similarly coupled to the reference fuel sources 108–1 . . . 108–$m$ by a line 112 through associated valves 114–1 . . . 114–$m$. The valves 110–1 . . . 110–$m$ are coupled by associated electrical conductors 116–1 . . . 116–$m$ to a reference fuel selector 118. The valves 114–1 . . . 114–$m$ are similarly coupled by electrical conductors 120–1 . . . 120–$m$ to a reference fuel selector 122. The selectors 118 and 122 may each take the form of the stepping switch 78 shown in FIG. 8, and thus each selectively energizes only one of the associated valves coupled thereto. The selectors 118 and 122 are coupled together by a clutch coupling 124, and are driven by a reference fuel selector clockwise drive 126, as well as a reference fuel selector counterclockwise drive 128.

The various components of the system shown in FIGS. 2A and 2B are under the control of the timer 64 which periodically energizes the stepping switch actuator 66. The actuator is coupled to a test fuel selector drive stepping switch 130, to a float bowl level control stepping switch 132, to a float bowl selector control stepping switch 134, to a compression ratio changer stepping switch 136, to an initial reference fuel selector stepping switch 138, to a reference fuel selector stepping switch 140, to a scanning knockmeter stepping switches 142, 144, and 146, and to an octane number computer and logger stepping switch 148.

The following description explains how the system of FIGS. 2A and 2B operates to test a plurality of $n$ fuels, the test of each fuel proceeding in a series of thirteen discrete steps.

Step 1

It is assumed that the timer 64 has just energized the stepping switch actuator 66 and caused all of the stepping switches 130 through 148 to be moved to their first positions. Thus, movable contact 150 of the stepping switch 130 energizes terminal 1 of the switch, thereby applying power to and energizing the test fuel selector drive 104 and moving the movable contact 102 of the test fuel selector 100 to terminal 1 of the selector. This energizes the associated valve 98–1 and applies test fuel 1 from the fuel source 96–1 to the float bowl 28.

Movable contact 152 of the stepping switch 134 is connected to terminal 1 of the switch, thereby energizing a position 1 input of the float bowl selector control 26'. When this input of the control 26' is energized, the control actuates the selector valve 24' to couple the float bowl 28 to the carburetor 22, thereby supplying the carburetor with the test fuel from the fuel source 96–1.

Movable contact 154 of the stepping switch 132 is connected to terminal 1 of the switch, thereby energizing the level control 46, which determines the fuel level in the float bowl 28 and thus the fuel-air ratio of the combustible mixture in the engine 20. The level control 46 is regulated by signals from the knock maximizer 44 which causes the fuel level in the float bowl 28 to be varied until maximum intensity detonation is established and maintained in the test engine 20.

None of the remaining stepping switches 136 through 148 energizes an associated component when in its first position. Thus, in Step 1 of the testing sequence, a first test fuel is applied to the engine 20 at a fuel-air ratio which produces maximum intensity detonation in the engine.

Step 2

After sufficient time has elapsed to ensure that the maximum intensity detonation level of fuel in the float bowl 28 has been established, the timer 64 energizes the stepping switch actuator 66 and causes all the stepping switches 130 through 148 to move to their second positions. Inasmuch as the test fuel selector drive 104 is coupled only to the terminal 1 of the stepping switch 130, further movement of the switch beyond this position does not affect the test fuel selector drive, and thus the test fuel selector 100 remains in its first position continuing to energize the valve 98–1 and applying the first test fuel from the fuel source 96–1 to the float bowl 28 for the duration of the entire testing sequence.

The stepping switch 134 in its second position continues to energize the position 1 input of the float bowl selector control 26', thereby continuing to couple the float bowl 28 with the test fuel therein to the carburetor 22. The stepping switch 132, however, no longer energizes the level control 46, thereby leaving the fuel level in the float bowl 28 fixed at the maximum intensity detonation level established in Step 1.

Movable contact 156 of the stepping switch 136 is connected to terminal 2 of the switch, thereby energizing the compression ratio changer 62. The compression ratio changer is controlled by signals from the knockmeter set point control 50, and thus the compression ratio in the engine 20 is adjusted so that detonation in the engine conforms to the standard established for the test, such as a knockmaster reading of 55. In Step 2, then, with the fuel-air ratio established to produce maximum intensity detonation, the engine is adjusted for standard detonation.

Step 3

After a predetermined time, the timer 64 energizes the stepping switch actuator 66 and causes the stepping switches 130 through 148 to move to their third positions. The float bowl selector control stepping switch 134 continues to provide for the supplying of the test fuel from the float bowl 28 to the carburetor 22. The stepping switch 136 no longer energizes the compression ratio changer 62, thereby leaving the compression ratio in the engine 20 fixed at that ratio producing standard knocking, as established in Step 2. The stepping switch 132 reenergizes the level control 46, and thus the fuel level in the float bowl 28 is again varied so that maximum intensity detonation is achieved and maintained in the engine 20.

Step 4

After a predetermined interval, the timer 64 energizes the stepping switch actuator 66 and causes the stepping switches 130 through 148 to move to their fourth positions. The float bowl selector control stepping switch 134 continues to provide for the supplying of the test fuel from the float bowl 28 to the carburetor 22. The stepping switch 132 no longer energizes the level control 46, thereby retaining the fuel level in the float bowl 28 at the maximum intensity detonation level established in Step 3. The stepping switch 136 energizes its terminal 4 to reenergize the compression ratio changer 62 and to readjust the compression ratio in the engine 20 so that detonation is established and maintained at the standard established by the knockmeter set point control 50.

As may be noted, the first four positions of the stepping switches 130 through 148 provide for the supplying of the first test fuel to the engine 20 and for the sequential adjustment of fuel-air ratio and engine compression ratio, two adjustments being made for each, to ensure that the engine 20 is operated for the test fuel at standard detonation at the fuel-air ratio which maximizes detonation intensity. In the remaining positions of the stepping switches, the compression ratio changer 62 is not energized. Thus, for the duration of the testing sequence, the compression ratio in the engine 20 is maintained at the setting established in Step 4 producing standard detonation for the test fuel.

Step 5

After a predetermined interval, the timer 64 causes the stepping switches 130 through 148 to be moved to their fifth positions. The stepping switch 134 energizes its terminal 5, thereby energizing a position 2 input of the float bowl selector control 26' and deenergizing the position 1 input. When the position 2 input of the control is energized, the selector valve 24' is actuated to couple the float bowl 32 to the carburetor 22. At the same time, movable contact 158 of the stepping switch 138 is connected to terminal 5 of the switch, thereby energizing an initial reference fuel selector 160. The inital reference fuel selector is coupled to the compression ratio changer 62 and serves to select one of the reference fuels in the fuel sources 108–1 . . . 108–$m$ which, when introduced to the engine 20, is most likely to produce detonation conforming to the pre-established standard.

An illustrative form of initial reference fuel selector 160 is shown in FIG. 10. Referring to that figure, a movable contact or rotor 162, typically coupled to a power supply (not shown), is driven from the compression ratio changer 62, and its position thus corresponds to the compression ratio in the test engine 20 established in Step 4. The rotor 162 is adapted to contact one of a plurality of segments 164–1, 164–2, 164–3 . . . 164–11. Each of the segments corresponds to a different range of compression ratios in the test engine. For example, the segment 164–3 represents the compression ratio range 6.24:1–6.34:1, i.e., the range 640–661 as represented by the standard mechanical counter forming an accessory of the approved ASTM–CFR engine.

The segments 164–1 . . . 164–11 are coupled by associated conductors 166–1 . . . 166–11 to a pulse generator 168. The pulse generator generates a plurality of output pulses on an output conductor 170, the number of pulses, for example, being related to which of the conductors 166–1 . . . 166–11 is energized by the rotor 162. The compression ratio in the engine 20 is accordingly translated into a series of pulses. The pulse generator 168 may comprise a plurality of pulse train generating circuits as shown in FIGS. 10–26 of Pulse and Digital Circuits, McGraw-Hill Book Company, Inc., 1956. Each of the circuits are connected to one of the lines 166–1 to 166–11 to generate a different number of pulses indicative of the compression ratio.

Referring again to FIGS. 2A and 2B, the conductor 170 from the initial reference fuel selector 160 is coupled to the reference fuel selector clockwise drive 126. The drive 126 actuates the reference fuel selectors 118 and 122 to cause each of the selectors to select one of the output conductors 116–1 . . . 116–$m$ and 120–1 . . . 120–$m$, respectively, depending upon the number of pulses applied by the conductor 170 to the drive 126.

At the same time, movable contact 172 of the stepping switch 140 is connected to terminal 5 of the switch and applies power to the reference fuel selector 118 through a delay 174. The delay provided is of sufficient duration to ensure that the selector 118 is not energized until after it has been actuated by the reference fuel selector clockwise drive 126. When the selector 118 is energized by the stepping switch 140, the selected one of the output conductors 116–1 . . . 116–$m$ is energized, thereby energizing the associated one of the valves 110–1 . . . 110—$m$ and coupling the corresponding reference fuel to the float bowl 32. Accordingly, one of the $m$ reference fuels is selected for application to the float bowl 32, depending upon the compression ratio in the test engine 20 as established in Step 4. In this regard, it will be noted that the initail reference fuel selector 160 may be calibrated so that the reference fuel selected is that fuel most likely to result in knocking in the engine 20 that conforms to the pre-established standard at the particular compression ratio established in the engine.

Step 6

After the reference fuel selected by the initial reference fuel selector 160 is applied to the float bowl 32 to power the engine 20, the timer 64 causes the stepping switches 130 through 148 to be moved to their sixth positions. The stepping switch 140 continues to energize the reference fuel selector 118 to apply the selected reference fuel to the float bowl 32. The stepping switch 134 continues to energize the position 2 input of the float bowl selector control 26', thereby continuing to couple the float bowl 32 to the carburetor 22. The stepping switch 132 energizes its terminal 6 and applies power to the level control 48 coupled to the float bowl 32. The level control 48, as regulated by signals from the knock maximizer 44, varies the fuel level in the float bowl 32 to establish and maintain maximum intensity detonation in the engine 20 for the selected reference fuel applied to the float bowl.

Step 7

After the fuel-air ratio of the selected reference fuel has been established so that maximum intensity detonation is produced in the engine 20, the timer 64 causes the stepping switches 130 through 148 to be moved to their seventh positions. The float bowl selector control stepping switch 134 continues to couple the float bowl 32 to the carburetor 22. The stepping switch 132 no longer energizes the level control 48, and thus the fuel level in the float bowl 32 is retained at the maximum intensity detonation level established in Step 6.

At this time, the system determines whether or not a proper reference fuel has been selected by the initial reference fuel selector 160, i.e., whether or not the detonation magnitude of the selected reference fuel falls within a predetermined range from the standard established for the test. For this purpose, a scanning knockmeter 176 is employed which receives signals from the engine 20 via a conductor 177. The knockmeter 176 is energized through a normally closed switch 178 by movable contact 180 of the stepping switch 142 which is in its seventh position.

The scanning knockmeter 176 may take the form shown in FIG. 11. This is a typical knockmeter having a pointer 182 whose position is representative of the intensity of detonation in the engine 20. The tip of the pointer contains a small light source 184 of negligible weight not affecting the mass of the moving knockmeter system. The face of the knockmeter is divided into four compartments, 186–1, 186–2, 186–3, and 186–4. Behind each compartment on a back plate 188 are a series of associated photoswitches 190–1, 190–2, 190–3, and 190–4. Depending upon the position of the knockmeter pointer 182, the light from the source 184 impinges upon and energizes one of the photoswitches 190–1 through 190–4. In this fashion, the knockmeter 176 determines into which of four ranges knocking in the engine falls. These four ranges may typically represent the knockmeter ranges 0–40, 40–55, 55–70, and 70–100.

The photoswitches 190–1 through 190–4, as shown in FIG. 2B, are coupled to a control unit 192. Based upon which of the photoswitches is energized, the control unit ultimately provides for the selection of two reference fuels which, when applied to the engine 20, result in knocking intensities that bracket the knocking intensity of the test fuel. The details of the timing control are shown in FIGS. 3A through 3D, as well as 4A through 4C.

Step 7.—Knockmeter reading 0 to 40

FIG. 3A shows the portion of the control unit 192 which is energized if the reference fuel initially selected by the initial reference fuel selector 160 produces a knockmeter reading between 0 and 40 in the scanning knockmeter 176. A knockmeter reading in this range indicates that the reference fuel initially selected is not within an acceptable lower limit from the standard knockmeter reading 55 and hence, that the reference fuel is of too high an octane number. The circuit of FIG. 3A serves to select a reference fuel of lower octane number which produces knocking between 40 and 55 in the engine 20. This is accomplished as follows:

The photoswitch 190–1, energized at the commencement of Step 7 with a knockmeter reading between 0 and 40, applies a signal to the reference fuel selector counterclockwise drive 128 which drives the reference fuel selectors 118 and 122 one position counterclockwise and selects the reference fuel having the octane number next below that of the reference fuel initially selected by the selector 160 in Step. 5. After a slight interval provided by a delay 194, the reference fuel selector 118 is energized to energize in turn the appropriate one of the output conductors 116–1 through 116–*m* and thus apply the new reference fuel to the float bowl 32. Concurrently, the signal from the photoswitch 190–1 is applied to an off-switch 196 which deactivates the timer 64 and prevents the stepping switch actuator 66 from stepping the stepping switches 130 through 148 to their next or eighth positions. The signal from the photoswitch 190–1 is also applied as an off signal to the normally closed switch 178, thereby opening the switch and de-energizing the scanning knockmeter 176. The reference fuel selector 118 and the off-switch 196, however, remain energized through latching relay action, for example.

After a period of time sufficient to ensure stable operation of the engine 20 on the new reference fuel supplied to the float bowl 32, the normally closed switch 178 is again energized through a delay 198. The scanning knockmeter 176 thus is re-energized and the latching relay action of the reference fuel selector 118 and the off-switch 196 is reset. If the knocking or detonation in the engine 20 is again within the range 0 to 40 on the knockmeter, the photoswitch 190–1 is again activated, repeating the above steps and selecting the reference fuel of next lower octane number.

Accordingly, as long as the reading of the knockmeter 176 is between 0 and 40, the circuit of FIG. 3A is activated and sequentially selects reference fuels of succeedingly lower octane numbers until a reference fuel is selected having a knockmeter reading which is greater than 40. Inasmuch as successive reference fuels exhibit knocking characteristics that typically differ by no more than 15 on the knockmeter scale, the circuit of FIG. 3A selects a reference fuel producing a knockmeter reading between 40 and 55.

It should be noted that for each of the reference fuels selected by the circuit of FIG. 3A and applied to the engine 20, the fuel-air ratio is maintained fixed at the level established in Step 6 by the knock maximizer 44 for the first reference fuel selected by the initial reference fuel selector 160. Inasmuch as the reference fuel ultimately selected by the circuit of FIG. 3A will be closely related in composition to the reference fuel first selected by the selector 160, the fuel-air ratio for the fuels selected by the circuit of FIG. 3A need not be adjusted. However, if it is desired to vary the fuel-air ratio of all the reference fuels applied to the engine by the circuit of FIG. 3A, the level control 48 may be selectively energized, for example, by the off signal applied to the normally closed switch 178.

Step 7.—Knockmeter reading 70 to 100

Figure 3B:
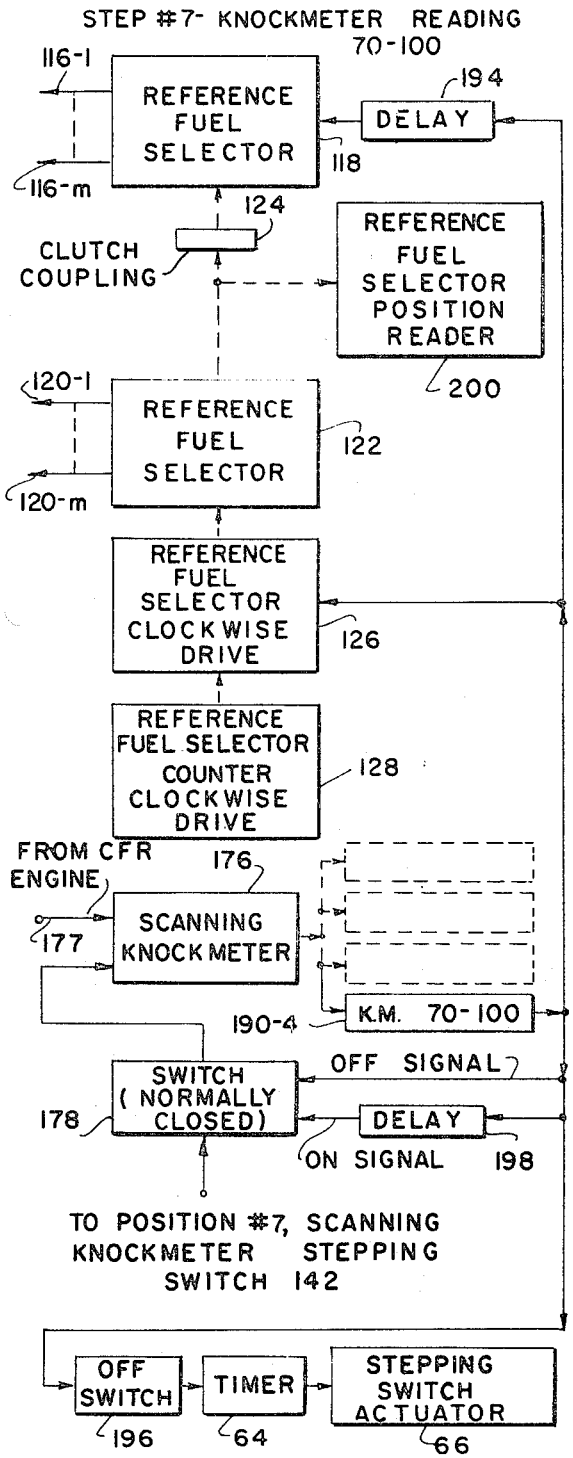

FIG. 3B shows the portion of the control unit 192 which is energized if the reference fuel initially selected by the initial reference fuel selector 160 produces a knockmeter reading between 70 and 100 in the scanning knockmeter 176. A knockmeter reading in this range indicates that the reference fuel initially selected is not within an acceptable upper limit from the standard knockmeter reading of 55 and hence, that the reference fuel is of too low an octane number. The circuit of FIG. 3B serves to select a reference fuel of higher octane number which produces knocking between 55 and 70 in the engine 20. This is accomplished as follows:

The photoswitch 190–4, energized at the commencement of Step 7 with a knockmeter reading between 70 and 100, applies a signal to the reference fuel selector clockwise drive 126, which drives the reference fuel selectors 118 and 122 one position clockwise and selects the reference fuel having the octane number next above that of the reference fuel initially selected by the selector 160 in Step 5. After a slight interval, as provided by the delay 194, the reference fuel selector 118 is energized to energize in turn the appropriate one of the conductors 116–1 through 116–*m*, thus applying the new reference fuel to the float bowl 32. Concurrently, the signal from the photoswitch 194–4 is applied to the off-switch 196 to deactivate the timer 64 and prevent the stepping switches 130 through 148 from being stepped to their next or eighth positions. The signal from the photoswitch 190–4 is also applied as an off signal to the normally closed switch 178, thereby opening the switch and de-energizing the scanning knockmeter 176. The reference fuel selector 118 and the off-switch 196, however, remain energized through the latching relay action associated therewith.

After a period of time sufficient to ensure stable operation of the engine 20 on the new reference fuel of higher octane number, the normally closed switch 178 is again energized through the delay 198, thereby re-energizing the scanning knockmeter 176 and resetting the latching relay arrangement associated with the reference fuel selector 118 and the off-switch 196. If knocking in the engine 20 is again within the range 70 to 100 on the knockmeter, the photoswitch 190–4 is again activated, repeating the above steps and selecting the reference fuel of next higher octane number among the reference fuels in the sources 108–1 through 108–*m*.

Accordingly, as long as the reading of the knockmeter 176 is between 70 and 100, the circuit of FIG. 3B is activated and sequentially selects reference fuels of succeedingly higher octane numbers until a reference fuel is selected having a knockmeter reading less than 70. Inasmuch as successive reference fuels exhibit knocking characteristics typically differing by no more than 15 on the knockmeter scale, the circuit of FIG. 3B selects a reference fuel having an octane number which results in a knockmeter reading between 55 and 70.

Step 7.—Knockmeter Reading 40 to 55

Figure 3C:
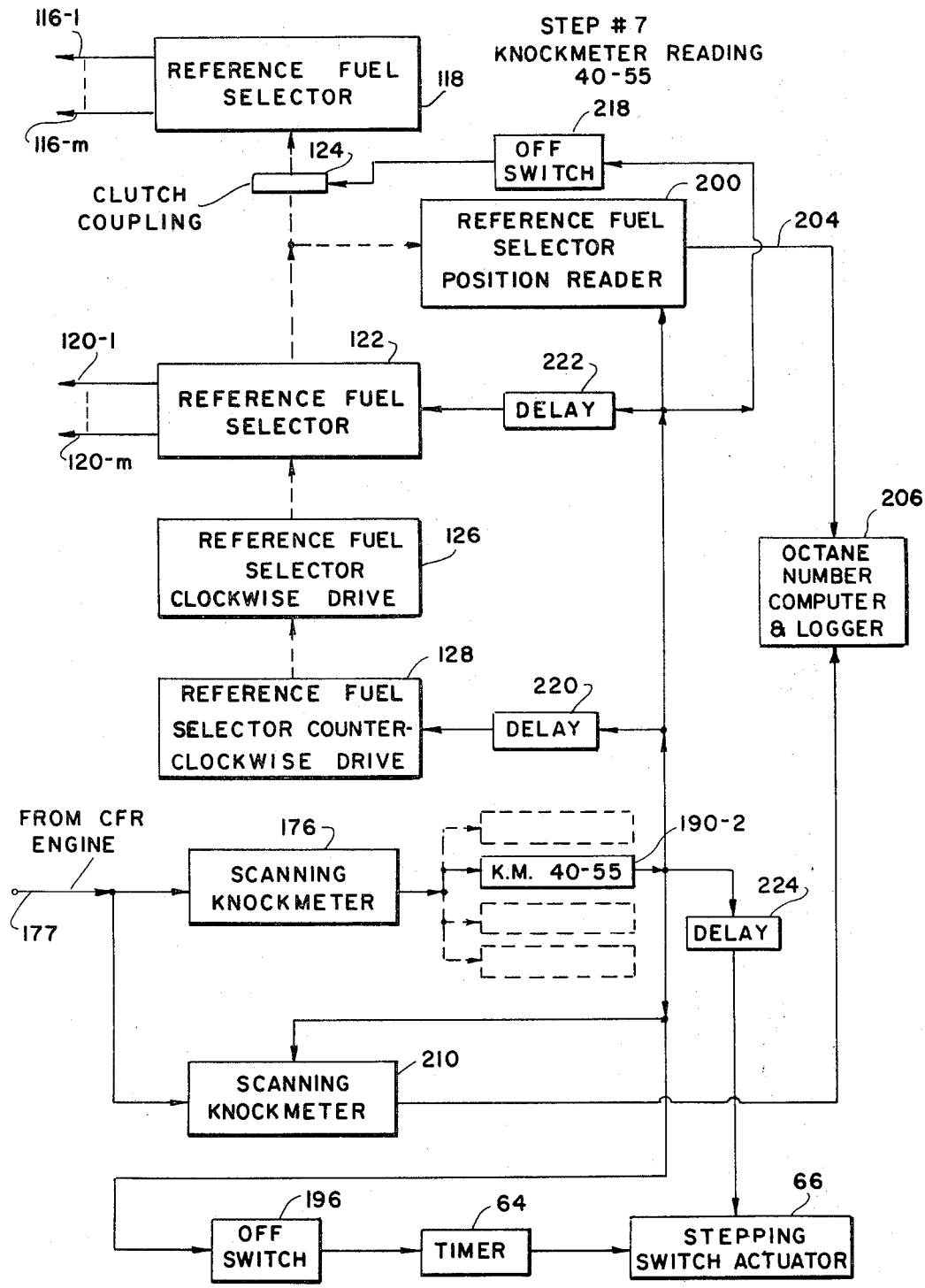

FIG. 3C shows the portion of the control unit 192 which is energized when the reference fuel selected by the initial reference fuel selector 160 or by the circuit of FIG. 3A produces a knockmeter reading between 40 and 55 in the scanning knockmeter 176. A knockmeter reading in this range indicates that the reference fuel selected is within an acceptable lower limit from the standard knockmeter reading of 55. The circuit of FIG. 3C serves to provide signals representative of the knock magnitude and the known octane number of this reference fuel, as well as to select a second reference fuel of lower octane number which will produce knocking between 55 and 70 in the engine 20. Such a second reference fuel, when taken with the first reference fuel, will therefore bracket the test fuel. This is accomplished as follows:

The photoswitch 190–2, energized when the reading of the knockmeter 176 is between 40 and 55, applies a signal to a reference fuel selector position reader 200, the details of which are shown in FIG. 9. Referring to that figure, the position reader 200 may comprise a stepping switch whose movable contact 202 is coupled to and driven by the reference fuel selectors 118 and 122. The switch includes terminals 1, 2, 3, 4 . . . m that are coupled to potential sources $V_1$, $V_2$, $V_3$, $V_4$ . . . $V_m$ which represent the octane numbers of the different reference fuels. Depending upon the position of the movable contact 202, which is representative of the position of each of the reference fuel selectors 18 and 122, the corresponding one of the voltage sources $V_1$ through $V_m$ is coupled to output conductor 204.

Referring again to FIG. 3C, the reference fuel selector position reader 200 is coupled by the conductor 204 to an octane number computer and logger 206 which stores the signal representative of the known octane number of the selected reference fuel for later computations.

Concurrently, the signal from the photoswitch 190–2 energizes a scanning knockmeter 210 which receives signals representative of knocking in the engine 20 via the conductor 177. The scanning knockmeter 210 may take the form shown in FIG. 13 to provide an output signal representative of the actual knocking in the engine 20. Referring to FIG. 13, the knockmeter pointer 58 contains a small light source 212 similar to the light source 184 of the knockmeter 176 of FIG. 11. The face of the knockmeter 210 is divided into fifty compartments, 214–1, 214–2 . . . 214–50, and light from the source 212 passes through a particular one of the compartments depending upon the position of the knockmeter pointer 58 to activate an associated one of photoswitches 216–1, 216–2 . . . 216–50. Thus, if the total movement of the knockmeter pointer 58 encompasses knockmeter readings between 0 and 100, the knockmeter reading is represented with an accuracy of two whole numbers on the knockmeter scale.

Referring again to FIG. 3C, the energized scanning knockmeter 210 applies a signal representative of the actual knockmeter reading of the selected reference fuel to the octane number computer and logger 206 for storage and later computations.

The signal from the photoswitch 190–2 is concurrently applied to the off-switch 196 to disable the timer 64. The signal is also applied to an off-switch 218 which de-energizes the clutch coupling 124, thereby decoupling the reference fuel selector 118 from the selector 122 and the drives 126 and 128. This leaves the reference fuel selector 118 in the position selecting the chosen first reference fuel exhibiting a knock intensity between 40 and 55, and provides for the proper energization of the associated one of the conductors 116–1 through 116–$m$ in later steps.

After a short delay provided by a delay 220, the photoswitch 190–2 energizes the reference fuel selector counterclockwise drive 128 to drive the reference fuel selector 122 so that it selects the reference fuel having the octane number next below that of the fuel selected by the selector 118. Thus, an appropriate one of the output conductors 120–1 through 120–$m$ is selected by the selector 122, which is energized following a slight delay provided by a delay 222. Thus, a second reference fuel is selected which, when applied to the test engine 20, will result in knocking between 55 and 70, and which, when taken with the first reference fuel, will bracket the test fuel.

Following this, the stepping switch actuator 66 is energized through a delay 224, thus causing the stepping switches 130 through 148 to be moved to their next or eighth positions and continuing the testing sequence.

Step 7.—Knockmeter Reading 55 to 70

Figure 3D:
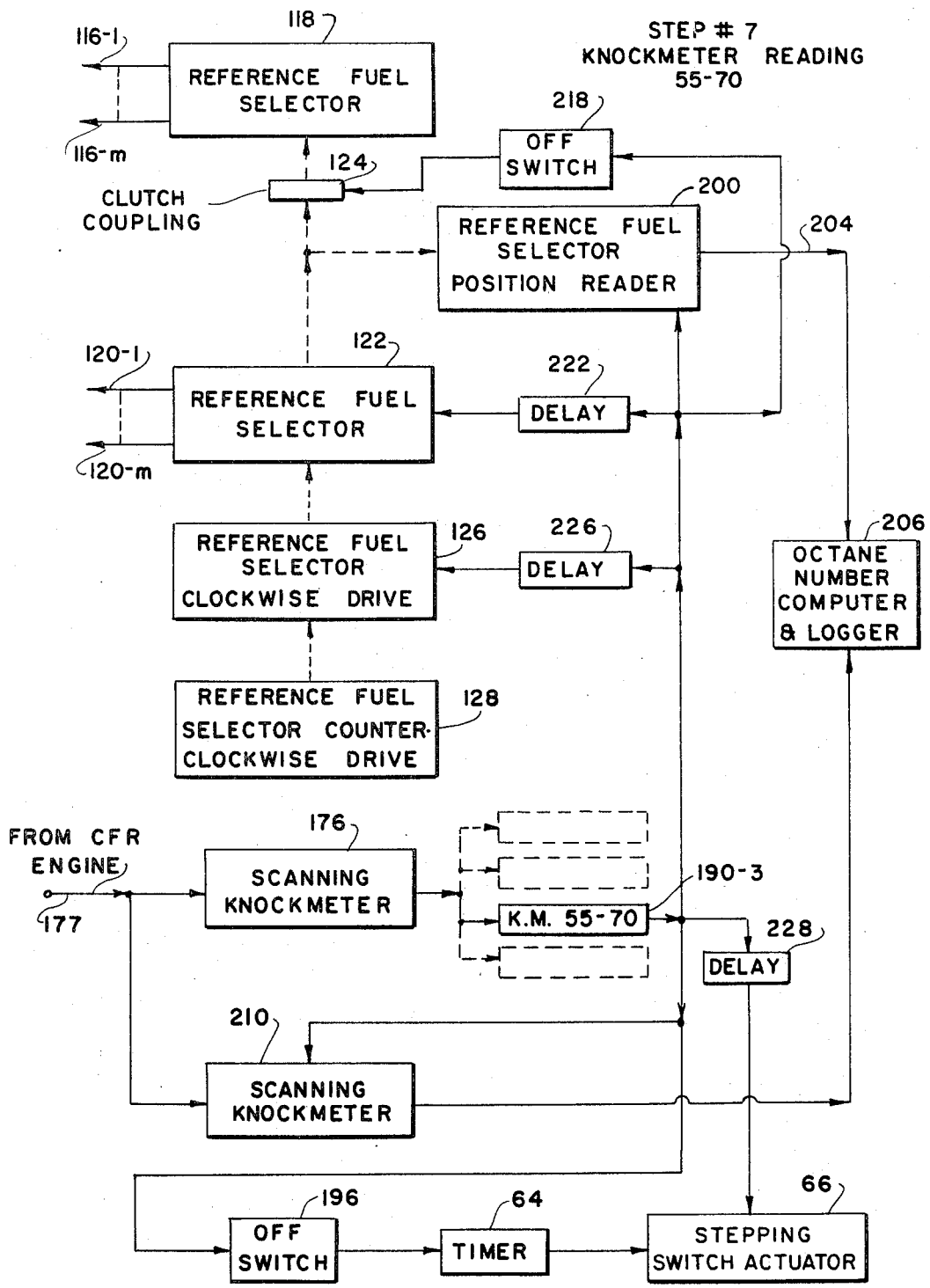

FIG. 3D shows the portion of the control unit 192 which is energized when the reference fuel selected by the initial reference fuel selector 160 or by the circuit of FIG. 3B produces a knockmeter reading between 55 and 70 in the scanning knockmeter 176. A knockmeter reading in this range indicates that the reference fuel selected is within an acceptable upper limit from the standard knockmeter reading of 55. The circuit of FIG. 3D serves to provide signals representative of the knock magnitude and the octane number of this reference fuel, as well as to select a second reference fuel of higher octane number which will produce knocking between 40 and 55 in the engine 20. Such a second reference fuel, when taken with the first reference fuel, will bracket the test fuel. This is accomplished as follows:

The photoswitch 190–3, energized when the reading of the knockmeter 176 is between 55 and 70, applies a signal to the off-switch 196 which inhibits the timer 64 and prevents it from actuating the stepping switch actuator 66. At the same time, the signal from the photoswitch 190–3 energizes the reference fuel selector position reader 200 which applies a signal representative of the known octane number of the reference fuel selected by the selector 118 to the octane number computer and logger 206. At the same time, the scanning knockmeter 210 is energized applying a signal representative of the actual knockmeter reading of the selected reference fuel to the octane number computer and logger.

The off-switch 218 is also energized, thereby deactivating the clutch coupling 124 and decoupling the reference fuel selector 118 from the selector 122 and the drives 126 and 128, which leaves the selector 118 in its last position providing for the selection of the chosen first reference fuel in later steps. After a slight delay provided by a delay 226, the reference fuel selector clockwise drive 126 steps the reference fuel selector 122 one position clockwise, selecting the reference fuel having the octane number next above that of the first reference fuel selected by the selector 118. Subsequently, the selector 122 is energized through the delay 222, and the appropriate one of the conductors 120–1 through 120–$m$ is energized. Thus, a second reference fuel is selected having a knocking characteristic which, when taken with the characteristic of the first reference fuel, brackets that of the test sample.

Following this, the stepping switch actuator 66 is activated through a relay 228 which causes the stepping switches 130 through 148 to be moved to their next or eighth positions.

Step 8

After the selection and testing of the first bracketing reference fuel and the selection of the second bracketing reference fuel in Steps 5 through 7, the second reference fuel is tested in Step 8. As may be noted from FIG. 2A, the movable contact 152 of the stepping switch 134 energizes terminal 8 of the switch, which, in turn, energizes a position 3 input of the float bowl selector control 26'. With this input energized, the selector valve 24' couples the float bowl 94 to the carburetor 22. Concurrently, the stepping switch 140 energizes the reference fuel selector 122 to energize, in turn, the selected one of the valves 114.1 . . . 114-m and to couple the second bracketing reference fuel to the float bowl 94.

Movable contact 154 of the stepping switch 132 energizes terminal 8 of the switch, which, after a suitable delay provided by a delay 230, energizes a level control 232 coupled to the float bowl 94. The level control 232 is regulated by signals from the knock maximizer 44 and adjusts the level of fuel in the float bowl 94 to establish and maintain maximum intensity detonation in the engine 20.

Step 9

After a predetermined interval, the timer 64 energizes the stepping switch actuator 66 and causes the stepping switches 130 to 148 to move to their ninth positions. The float bowl selector control stepping switch 134 continues to provide for the supplying of the second bracketing reference fuel from the float bowl 94 to the carburetor 22. The stepping switch 140 continues to energize the reference fuel selector 122 to supply the second bracketing reference fuel to the float bowl 94. The stepping switch 132 no longer energizes the level control 232, and thus the level of fuel in the float bowl 94 is retained at the maximum intensity detonation level established in Step 8.

During this step, a scanning knockmeter 234 (FIG. 2B), which receives signals from the engine 20 through the conductor 177, is energized by movable contact 236 of the stepping switch 144. The scanning knockmeter may take the form of that shown in FIG. 12, and comprises a knockmeter pointer 238 whose position is representative of the magnitude of knocking in the engine 20. The pointer carries a small light source 240 thereon, which may be the same as the light source 184 in FIG. 11. The face of the knockmeter 234 is divided into three compartments: 242–1, 242–2, and 242–3, which typically represent the knockmeter ranges 0 to 40, 40 to 70, and 70 to 100, respectively. Three photoswitches 244–1, 244–2, and 244–3 are each associated with a different one of the knockmeter compartments. Accordingly, depending upon the position of the pointer 238 and which one of the photoswitches is thereby energized, the knockmeter indicates into which one of three ranges knocking occurs in the test engine.

Referring again to FIG. 2B, the photoswitches 244–1, 244–2, and 244–3 are coupled to the control unit 191, the applicable portion of which is shown in FIGS. 4A through 4C. Referring to FIG. 4A, if the photoswitch 244–1 is activated, indicating a knockmeter reading for the second bracketing reference fuel in the range 0 to 40, which represents the selection of an improper reference fuel, an alarm signal 246 is energized providing an audible or visual alarm, for example. At the same time, the off-switch 196 is energized, deactivating the timer 64 and preventing the stepping switch actuator 66 from being actuated. The test sequence is therefore stopped until manual correction can be made.

Referring to FIG. 4B, the photoswitch 244–3 is activated if the knockmeter reading of the scanning knockmeter 234 falls between 70 and 100, which represents another improper selection of a second bracketing reference fuel. As in the system of FIG. 4A, the alarm signal 246 is energized, as well as the off-switch 196 to deactivate the timer 64 and the stepping switch actuator 66·

In FIG. 4C, the photoswitch 244–2 is energized if the reading of the scanning knockmeter 234 is between 40 and 70, which represents the selection of a proper second bracketing reference fuel. In this case, the photoswitch energizes the off-switch 196 and temporarily prevents the timer 64 from being actuated. The photoswitch energizes the scanning knockmeter 210 to provide a signal representative of the actual knocking in the engine 20 to the octane number computer and logger 206 for storage and subsequent computations. At the same time, the signal from the photoswitch energizes the reference fuel selector position reader 200 to apply a signal to the computer 206 representative of the known octane number of the second bracketing reference fuel. Following this, after a delay provided by a delay 248, the stepping switch actuator 66 is actuated, causing all the stepping switches 130 through 148 to be moved to their next or tenth positions to continue the test sequence.

Step 10

Referring to FIGS. 2A and 2B, the stepping switch 134 energizes the position 1 input of the float bowl selector control 26', which actuates the valve 24' to couple the float bowl 28 with the test fuel therein to the carburetor 22. Movable contact 250 of the stepping switch 146 energizes the scanning knockmeter 210 through a delay 252. The delay 252 inhibits the energization of the scanning knockmeter until operation of the engine 20 on the test fuel is stable. When energized, the scanning knockmeter provides a signal to the octane number computer and logger 206 representative of the actual knocking in the test engine for the test fuel.

Step 11

After a predetermined time, the timer 64 causes the stepping switches 130 through 148 to be moved to their eleventh positions. The stepping switch 134 energizes the position 3 input of the float bowl selector control 26', thereby supplying the second bracketing reference fuel from the float bowl 94 to the carburetor 22. The stepping switch 140 energizes the reference fuel selector 122, which supplies this fuel from the appropriate one of the sources 108–1 . . . 108–m to the float bowl. After a delay provided by the delay 252, the stepping switch 146 energizes the scanning knockmeter 210 to provide a signal to the octane number computer and logger 206 representative of knocking in the engine 20 for the second bracketing reference fuel.

Step 12

The timer 64 next causes the stepping switches 130 through 148 to proceed to their twelfth positions. The stepping switch 134 energizes the position 2 input of the float bowl selector control 26', thereby coupling the float bowl 32 to the carburetor 22· The stepping switch 140 energizes the reference fuel selector 118 to supply the first bracketing reference fuel to the float bowl 32. The stepping switch 146 energizes through the delay 252 the scanning knockmeter 210 and provides a signal to the octane number computer and logger 206 that is representative of knocking in the engine 20 for the first bracketing reference fuel.

Step 13

Figure 5:
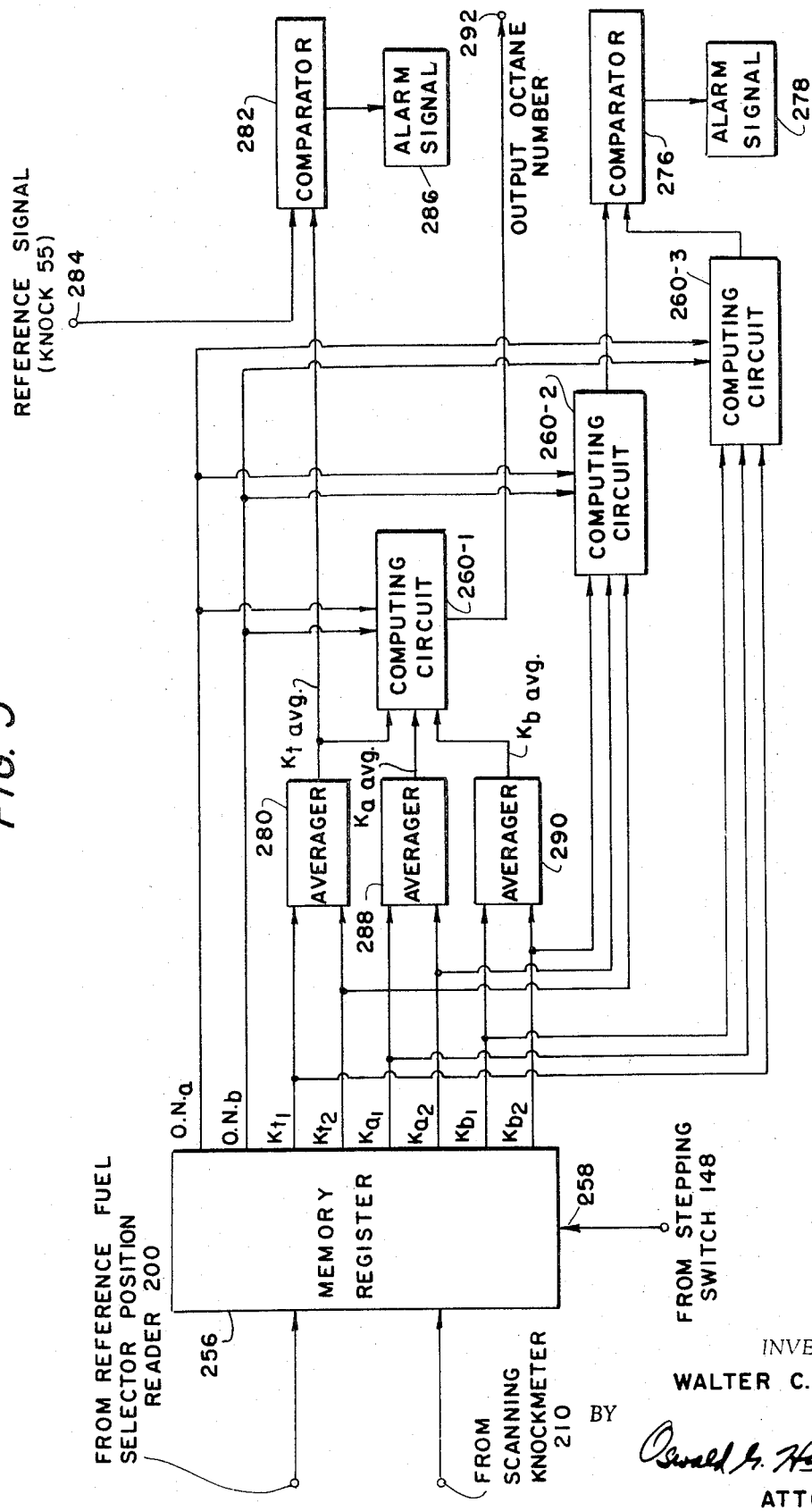
FIG. 5 is a block diagram of a computer forming a portion of the system of FIGS. 2A and 2B.

The timer 64 next causes the stepping switches 130 through 148 to proceed to their thirteenth positions. Movable contact 254 of the stepping switch 148 energizes terminal 13 of the switch, thereby energizing the octane number computer and logger 206 to provide for the computation and logging or recording of the octane number of the test fuel from the signals stored in the computer. The computer is shown in FIG. 5, and includes a memory register 256 which has signals applied thereto from the reference fuel selector position reader 200 and the scanning knockmeter 210. The signals stored in the memory register 256 from the position reader 200 represent the known octane numbers of the first and second bracketing reference fuels, and are applied to the memory register in Steps 7 and 9, respectively. These signals, represented in the following description as $O.N._a$ and $O.N._b$, respectively, appear as output signals on the correspondingly labeled output leads from the memory register 256 when the register is enabled by the signal applied to an enabling control input 258 from the stepping switch 148.

The signals from the scanning knockmeter 210 that are stored in the memory register 256 are representative of knocking in the test engine 20 for the test and two bracketing reference fuels. When the register is energized by the enabling signal applied to the input 258, these signals appear as output signals $K_{t1}$, $K_{t2}$, $K_{a1}$, $K_{a2}$, $K_{b1}$, and $K_{b2}$ on the correspondingly labeled output leads. The signal $K_{t1}$ represents the knockmeter reading for the test fuel as developed in Step 4. Inasmuch as the compression ratio is adjusted in Step 4 to provide standard knocking, the signal $K_{t1}$ may be a constant stored permanently in the memory register. The signal $K_{t2}$ represents the reading of the knockmeter 210 for the test fuel as applied to the computer in Step 10. The signals $K_{a1}$ and $K_{a2}$ represent the reading of the knockmeter 210 for the first bracketing reference fuel as applied to the computer in Steps 7 and 12, respectively. Finally, the signals $K_{b1}$ and $K_{b2}$ represent the reading of the knockmeter 210 for the second bracketing reference fuel as applied to the computer in Steps 9 and 11, respectively.

In accordance with the approved ASTM Test D908–61, for example, the two series of readings for each of the test and two bracketing reference fuels are acceptable if the octane number of the test fuel computed from the first series of readings minus the octane number of the test fuel computed from the second series of readings is no greater than ±0.3 octane number, and the average knockmeter reading of the test fuel is between 50 and 60. If these criteria are met, the two knockmeter readings for each of the test and two bracketing reference fuels are averaged, and the octane number of the test fuel is determined therefrom.

The system of FIG. 5 carries out these computations, and employs a computing circuit 260 shown in FIG. 6. The circuit of FIG. 6 is best explained with reference to FIG. 7, which shows the relationship between a test fuel $t$ and two bracketing reference fuels $a$ and $b$ in terms of octane number and knock magnitude in a test engine at a fixed compression ratio. The reference fuel $a$ of known octane number $O.N._a$ has a knock magnitude of $K_a$. The reference fuel $b$ of known octane number $O.N._b$ has a knock magnitude of $K_b$. The test fuel $t$ has a knock magnitude of $K_t$, and its octane number $O.N._t$ is determined by interpolation from the two reference fuels. The normal ASTM procedure assumes that a straight-line relationship exists between the reference fuels, as illustrated in FIG. 7, and thus the octane number $O.N._t$ of the test fuel may be expressed in terms of the knock magnitudes of the two reference fuels and their known octane numbers in accordance with the following expression:

$$O.N._t = \frac{(O.N._a - O.N._b)(K_t - K_a)}{K_a - K_b} + O.N._a \quad (1)$$

The computing circuit 260 of FIG. 6 carries out the computations involved in Expression 1 above. Referring to FIG. 6, signals representative of $O.N._a$ and $O.N._b$ are applied to a subtracter 262 which generates an output signal representative of the difference between the input signals. The output signal from the subtracter 262 is applied to a multiplier 264 which receives another input signal from a subtracter 266. The subtracter 266 has signals applied thereto representative of $K_t$ and $K_a$, and generates a signal representative of their difference. The signal from the multiplier 264, therefore, is representative of $(O.N._a - O.N._b)(K_t - K_a)$, i.e., the numerator of the fraction in Expression 1 above.

The signal from the multiplier 264 is applied to a divider 268, which also receives an input signal $K_a - K_b$ from a subtractor 270 which receives input signals $K_a$ and $K_b$. Accordingly, the output signal of the divider 268 is representative of $$\frac{(O.N._a - O.N._b)(K_t - K_a)}{K_a - K_b}$$

i.e., the fraction in Expression 1.

The signal from the divider 268 is applied to an adder 272 which receives another input signal representative of $O.N._a$. The output signal from the adder 272 appearing at an output terminal 274 is representative of Expression 1 above, i.e., the octane number of the test fuel $t$.

Referring to FIG. 5, computing circuits 260–1, 260–2, and 260–3 are the same as the circuit 260 of FIG. 6 and are employed to carry out the computations involved to determine if the two series of tests involving the test and bracketing reference fuels are acceptable. Accordingly, the signals $K_{t1}$, $K_{a1}$, and $K_{b1}$, representing the knockmeter signals for the test and two bracketing reference fuels for the first series of tests, are applied to the computing circuit 260–3, as are the signals $O.N._a$ and $O.N._b$ representing the known octane numbers of the first and second bracketing reference fuels. Similarly, the signals $K_{t2}$, $K_{a2}$, and $K_{b2}$, representing the knockmeter signals for the test and bracketing reference fuels for the second series of tests, are applied to the computing circuit 260–2, as are the signals representative of the octane numbers of the bracketing reference fuels. The computing circuits 260–3 and 260–2 compute octane numbers for the test fuel for the first and second series of tests, respectively. Output signals from these computing circuits are applied to a comparator 276 which generates an output signal only if the input signals differ by more than the equivalent of 0.3 octane number. If an output signal is generated, an alarm signal 278 is activated which indicates that the two series of tests are not acceptable.

The signals $K_{t1}$ and $K_{t2}$ are applied to an averager 280 which generates an output signal representative of the average knockmeter reading for the two series of tests for the test fuel, i.e., a signal $K_{t\ avg}$.

The output signal from the averager 280 is applied to a comparator 282 which also receives from an input terminal 284 a reference signal representative of a standard knockmeter reading, which is typically 55. This reference signal may be generated by any means such as a source of potential. The comparator 282 is set so that it generates an output signal only if its input signals differ by more than the equivalent of ±5 on the knockmeter scale. If this is the case, the two series of tests are not acceptable and, accordingly, an alarm signal 286 is activated.

The signals $K_{a1}$ and $K_{a2}$ are also applied to an averager 288. Similarly, the signals $K_{b1}$ and $K_{b2}$ are applied to an averager 290. The signals from the averagers 288 and 290 represent the average knockmeter reading for the first and second bracketing reference fuels, respectively, for the two series of tests, and are applied to the computing circuit 260–1. This circuit also receives the signal $K_{t\ avg}$ and $O.N._a$ and $O.N._b$. The computing circuit 260–1 thus computes the octane number of the test fuel from the average knockmeter readings for each of the test and bracketing reference fuels, as well as the known octane numbers of the reference fuels. A signal representative of this computed octane number is generated and applied to an output terminal 292. The signal on the terminal 292 is taken as the octane number of the test fuel only if neither of the alarm signals 278 and 286 is actuated, thereby fulfilling all the requirements of the standard ASTM test.

After the computation has been completed, the timer 64 (FIGS. 2A and 2B) causes the stepping switches 130 through 148 to move to their first positions. The stepping switch 130 energizes the test fuel selector drive 104 to switch to the next test fuel, and the test sequence is repeated. This continues until all $n$ test fuels have been tested.

The components of FIGS. 5 and 6 may comprise pneumatic analog computing elements. Such elements are described in an article entitled "Using Pneumatic Analog Computing Elements for Control" by Charles L. Mamzic which appeared in Control Engineering—Instrumentation and Control Systems, McGraw-Hill Publishing Company, Inc., April 1961. This article discloses a pneumatic peak selector which functions as a memory unit. A plurality of pneumatic peak selectors are suitable to store the inputs to the memory register 258. This article also discloses pneumatic analog elements for adding, subtracting, averaging (adding multiple inputs), multiplying and dividing to satisfy the adder 272, the subtracters 262, 266, 270, the averagers 280, 288, 290, the multiplier 264 and the divider 268, respectively, of FIGS. 5 and 6.

As described in Tektronix Service Scope, Beaverton, Oreg., February 1963, pages 2–3, an operation amplifier holds its final level until reset. Thus, a group of operational amplifiers as integrators may also be used to store the inputs to the memory register 256 until computation is to be carried out. Multiplication and summation circuits suitable for the octane number computer and logger 206 are also shown in Figs. 7–30 and 7–32 of Introductory System Analysis, Lynch and Truxal, McGraw-Hill Book Company, Inc., 1961, New York. Suitable multiplication and division circuits are also shown in Figs. 6, 7, 11 and 12 of Handbook of Automation, Computation, and Control, vol. 2, John Wiley & Sons, Inc., New York, 1959.

In addition, Pulse and Digital Circuits, McGraw-Hill Book Company, Inc., 1956, provides register, addition, substration, multiplication, division and comparator circuits suitable for the components of FIGS. 5 and 6.

It will be noted that the present invention provides for the determination of the octane number of a test fuel by either blending a reference blend of gasoline having a knocking characteristic the same as that of the test fuel or by selecting two bracketing reference fuels and testing them along with the test fuel to determine the octane number of the test fuel. The systems of FIGS. 1 and 2A and 2B have been described in terms of detonation magnitude as the combustion characteristic in accordance with which engine operation is maintained. Other variables may be employed as standards, such as time of detonation in an engine cycle to mention one such variable. Further, in the system of FIGS. 1 and 2A and 2B, the test sequence proceeds from one step to another on a time basis. It will be appreciated that time is only one of various ways by which the test sequence may be controlled.

It is obvious, then, that the invention is subject to modification, such as those cited above by way of example, and further that the procedures described above are applicable to fuels other than gasolines, such as diesel fuels. Accordingly, the invention is not to be deemed limited except as it is defined by the following claims.

What is claimed is:

1. In a system for detecting the combustion quality of a fuel, the combination of a single cylinder internal combustion engine having a repetitive operating cycle, and performing no useful work
   first means for adjusting the compression ratio of said engine to establish a predetermined knock intensity,
   second means to generate a signal representative of the knock intensity of the fuel powering said engine,
   third means for delivering fuel to said engine in a combustible mixture of varying fuel-air ratio to obtain maximum knock intensity,
   fourth means for storing reference fuels of known combustion properties connected to said third means,
   fifth means for storing at least one test fuel of unknown combustion quality connected to said third means,
   sixth means responsive to said second means to store signals representative of the detected knock intensity of the said fuels and for providing an output representative of the magnitude of the signals stored therein, and
   sequencing means which
      actuates said fourth and fifth fuel storage means to deliver fuel to said third means,
      actuates said sixth means to store signals from said second means representative of said fuels, and
      periodically actuates said sixth means to generate a signal responsive to the relative magnitudes of said stored signals.

2. The system of claim 1 wherein said sixth means includes a memory register to store signals representative of the detected knock intensity of the test and reference fuels and comparator means operatively connected to receive signals from said memory register.

3. In a system for detecting the combustion quality of a fuel under test, wherein the test fuel is used to power a test engine having a repetitive operating cycle; the combination of
   first means for generating a signal representative of the deviation from a pre-established standard of the character of combustion of fuel in said engine,
   compression ratio adjustment means responsive to said first means to maintain a pre-established character of combustion of the test fuel,
   means responsive to the compression ratio adjustment means for selecting at least one reference fuel,
   means for retaining the operation of the engine at the compression ratio established to maintain the pre-established character of combustion for the test fuel,
   means for applying the selected reference fuel to the test engine to detect the character of combustion of the reference fuel in the engine,
   second means actuated if the detected character of combustion of the selected reference fuel is not within a predetermined range from the detected character of combustion of the test fuel for selecting and applying to the test engine additional reference fuels of known combustion qualities until a reference fuel is selected exhibiting a character of combustion within the predetermined range,
   means for selecting at least one further reference fuel and applying it to the test engine to obtain in cooperation with said second means a further selected reference fuel having a detected character of combustion within a second predetermined range to bracket in character of combustion said test fuel in conjunction with said previously selected reference fuel,
   fuel level control means operatively responsive to the maximum character of combustion of said test and said selected reference fuels and operatively connected to said means for applying fuels to the test engine to vary the fuel delivered to said engine,
   wherein the selected reference fuels are of known combustion qualities and wherein the apparatus includes means responsive to the detected character of combustion of the test and selected reference fuels for providing an output representative of the combustion quality of the test fuel.

4. In a system for detecting the combustion quality of a fuel under test, wherein the test fuel is used to power a test engine having a repetitive operating cycle; the combination of
   means for detecting and adjusting a predetermined aspect of the engine operation for the test fuel while the engine is operated to maintain a pre-established character of combustion of the test fuel,
   means responsive to the detected aspect of the engine operation for selecting at least one reference fuel,
   means for retaining the operation of the engine at the setting established to maintain the pre-established character of combustion for the test fuel, means for applying the selected reference fuel to the test engine to detect the character of combustion of the reference fuel in the engine, means actuated if the detected character of combustion of the selected reference fuel is not within a predetermined range from the detected character of combustion of the test fuel for selecting and applying to the test engine additional reference fuels, until a reference fuel is selected exhibiting a character of combustion within the predetermined range, means for selecting at least one further reference fuel and applying it to the test engine to obtain a further selected reference fuel having a detected character of combustion within a predetermined range to bracket in character of combustion said test fuel in conjunction with said previously selected reference fuel, means for sequentially reapplying the test and selected reference fuels to the engine to determine in a second series of tests their characters of combustion in the test engine, wherein the selected reference fuels are of known combustion qualities and, wherein there are included means for generating a first output representative of the combustion quality of the test fuel based upon the known combustion qualities of the selected reference fuels and the detected characters of combustion of the test and selected reference fuels as initially applied to the engine, means for generating a second output representative of the combustion quality of the test fuel based upon known combustion qualities of the selected reference fuels and the detected characters of combustion of the test and selected reference fuels as applied to the engine in the second series of tests, means for generating a third output if the first and second outputs differ by more than a predetermined amount, means for generating a fourth output representative of the average character of combustion of the test fuel as applied to the engine initially and in the second series of tests, means for generating a fifth output if the fourth ouput differs from a predetermined reference by more than a pre-established amount, and means for generating a sixth output representative of the combustion quality of the test fuel based upon the known combustion qualities of the selected reference fuels and the average detected characters of combustion of each of the test and selected reference fuels as applied to the engine initially and in the second series of tests.

References Cited

UNITED STATES PATENTS

| | | | |
|---|---|---|---|
| 2,941,396 | 6/1960 | Adams | 73—35 |
| 3,220,243 | 11/1965 | Krause | 73—35 |

OTHER REFERENCES

ASTM Manual for Rating Motor Fuels by Motor and Research Methods, 1956 (Copy in Scientific Library TP343A64) pp. 23, 27 and 28.

JAMES J. GILL, Primary Examiner